United States Patent [19]
Fuller

[11] Patent Number: 5,632,038
[45] Date of Patent: May 20, 1997

[54] SECONDARY CACHE SYSTEM FOR PORTABLE COMPUTER

[75] Inventor: Samuel Fuller, Austin, Tex.

[73] Assignee: Dell USA, L.P., Austin, Tex.

[21] Appl. No.: 199,915

[22] Filed: Feb. 22, 1994

[51] Int. Cl.⁶ .................................................. G06F 1/26
[52] U.S. Cl. .......................... 395/750; 395/471; 395/472
[58] Field of Search ...................... 395/750, 425, 395/470, 471, 472; 365/226, 227; 364/707

[56] References Cited

U.S. PATENT DOCUMENTS

| | | | |
|---|---|---|---|
| 4,980,836 | 12/1990 | Carter et al. | 364/483 |
| 5,155,824 | 10/1992 | Edenfield et al. | 395/470 |
| 5,167,024 | 11/1992 | Smith et al. | 395/375 |
| 5,193,163 | 3/1993 | Sanders et al. | 395/470 X |
| 5,204,963 | 4/1993 | Noya et al. | 395/750 |
| 5,239,652 | 8/1993 | Seibert et al. | 395/750 |
| 5,339,445 | 8/1994 | Gasztonyi | 395/750 |
| 5,341,493 | 8/1994 | Yanai et al. | 395/425 |
| 5,367,697 | 11/1994 | Barlow et al. | 395/800 |
| 5,396,635 | 3/1995 | Fung | 395/800 |
| 5,404,543 | 4/1995 | Faucher et al. | 395/750 |
| 5,428,761 | 6/1995 | Herlihy et al. | 395/470 X |
| 5,432,947 | 7/1995 | Doi | 395/750 |
| 5,457,801 | 10/1995 | Aihara | 395/750 |
| 5,481,731 | 1/1996 | Conary et al. | 395/750 |

*Primary Examiner*—Glenn A. Auve
*Attorney, Agent, or Firm*—Mark P. Kahler; Henry N. Garrana; Diana L. Roberts

[57] ABSTRACT

A secondary cache memory system is disclosed for use in a portable computer that increases system performance while also conserving battery life. The secondary cache includes a cache controller for controlling the transfer to and from a cache memory, comprised of fast SRAM circuits. The cache controller includes a control and status register with at least three status bits to control power to the cache, and to insure that the data stored in the cache memory is coherent with system memory. A control and power management logic checks the contents of the control and status register, and monitors the activity level of the processor. When the processor is determined to be inactive, the control and power management logic turns off the cache by changing the state of a bit in the control and status register. Before doing so, however, the control and power management logic checks the status of a second bit in the control register to determine if some or all of the contents of the cache need to be flushed to system memory. During power up, the control and power management logic checks another status bit in the control register to determine if the contents of the cache is invalid, and if so, clears the cache.

20 Claims, 4 Drawing Sheets

SECONDARY CACHE SYSTEM FOR PORTABLE COMPUTER

BACKGROUND OF THE INVENTION

The present invention relates generally to a system for conserving power and increasing performance in a portable computer. More particularly, this invention relates to a system for reducing the number of wait states in a portable computer by adding an external cache memory comprised of SRAM circuits, in addition to any internal cache memory that may be provided in the main microprocessor. Still more particularly, this invention relates to a portable computer that includes a secondary cache that can be powered up for increased computational performance, and powered down during periods of inactivity to conserve power.

Data is transferred between the central processing unit ("processor" or "CPU") of the computer and conventional system memory in two steps. First, the CPU generates signals on the address bus representing the address of the desired memory location. At the next, or at subsequent, clock cycles, the CPU actually transfers data on the data bus to or from the addressed memory location. For the microprocessors in the INTEL 8086® family, the number of cycles for the CPU to access data in memory depends upon the processor and the speed of the memory unit.

Memory circuits comprise two general types: (1) static random access memory ("SRAM") circuits, and (2) dynamic random access memory ("DRAM") circuits. SRAM circuits are operable at very high speeds, matching the operating speed of high-end microprocessors. DRAM circuits, conversely, are slower and cannot match the speed of these microprocessors. SRAM circuits, however, are more expensive than DRAM circuits, and require much more space for the same amount of storage capacity.

The speed of memory circuits is based upon two timing parameters. The first parameter is memory access time, which is the minimum time required by the memory circuit to set up a memory address and produce or capture data on or from the data bus. The second parameter is the memory cycle time, which is the minimum time required between two consecutive accesses to the memory circuit. For SRAM circuits, the access time typically is equal to the cycle time. SRAM circuits are commercially available with cycle times of at least 30–40 nanoseconds. For DRAM circuits, conversely, the cycle time typically is twice the access time. Dram circuits have an access time in the range of 60–100 nanoseconds, with cycle times of 120–200 nanoseconds. The extra time required for consecutive memory accesses in a DRAM circuit is necessary because the internal memory circuits require additional time to recharge to accurately produce data signals. In addition, DRAM circuits also require periodic refresh cycles to protect the integrity of the stored data. These cycles consume approximately 5 to 10% of the time available for memory access.

Because of these limitations, memory constructed with DRAM circuits is not always capable of responding to memory accesses within the time interval allotted by the CPU. In this event, external circuitry must signal to the CPU that supplementary processor cycles, or wait states, are necessary before the data is ready on the data bus, or before data from the data bus has been stored by the memory circuits. In addition to slowing the processing of the CPU, wait states require use of the bus, thereby limiting access to the bus by other system circuitry.

As the operating speed of processors increase and as new generations of processors evolve, it is obviously advantageous to minimize wait states to fully exploit the capabilities of these new processors. Implementing these new generation of high speed processors in portable computers, however, is especially difficult, because of size and power limitations. In particular, the use of SRAM circuits to reduce the number of wait states has not been considered a viable alternative because of the power consumption of these types of circuits. Consequently, it is extremely difficult to design a system that reduces wait states in portable computers that implement the new high speed processors.

In the past, several alternative designs have been used to deal with this problem of wait states in personal computers. The simplest and least expensive design is to use standard DRAM circuits as the system (or main) memory, and accept the reduction in processing speed caused by the relatively large number of wait states. This method obviously results in an inefficient system, with an uneven performance level between the CPU and the memory system.

Another design uses more expensive, faster DRAM circuits as the system memory, that reduces the number of wait states to some limited extent. Even with fast DRAM circuits, however, the access time is not sufficiently short to eliminate wait states when high speed processors are implemented.

A third approach is to use SRAM circuits as the system memory. SRAM circuits, as noted, typically have a cycle time that is approximately equal to the access time. While this method is an effective solution to the problem of wait states, it is a solution that is very expensive, and requires a large amount of space and power. Because of space and power limitations in portable computers, SRAM circuits are not a viable alternative for system memory in these computers.

None of the above methods have proven to be a cost effective solution to the problem of wait states, especially in the context of portable computers. A hybrid approach, however, has been found and used extensively for reducing the number of wait states, particularly in desktop computers where power is not a critical design parameter. This technique commonly is referred to as memory caching. A memory cache is used in combination with a standard DRAM system memory to reduce the number of wait states. As shown in FIG. 1, the memory cache typically comprises a buffer of fast SRAM circuits placed between the CPU and main memory. The high speed memory cache is used to store recently accessed addresses and data in the SRAM buffer, where further accessing of this data can occur without any additional wait states. The underlying principle is that most application programs will work within small sections of code and with a relatively small set of data.

Cache memory systems have been used extensively to increase the speed at which memory is retrieved by the CPU. The memory cache essentially comprises a fast intermediate memory buffer between the processing circuits of the CPU and the main memory of the computer, which is used as the working memory for the processor. Physically, a cache memory can be located internally to the microprocessor chip (as is done in the INTEL 80486® chip), or can be implemented through external memory and control circuits (as must be done with the INTEL 80386® chip).

Although an eight Kbyte on-chip memory cache unit is provided as part of the INTEL 80486® architecture, those skilled in the art have realized that the number of wait states could be further reduced by adding a secondary or supplementary memory cache external to the 80486 or other microprocessor, comprised of fast SRAM circuits. Such a secondary cache has been used in certain desktop computers to increase the performance level of the computer.

SUMMARY OF THE INVENTION

The present invention solves the shortcomings and deficiencies of the prior art by constructing a portable computer with a secondary cache with power down features. A control and power management logic enables and disables the secondary cache based upon the requirements and activity of the processor.

The secondary cache includes a cache controller and a cache memory buffer. The cache controller controls the transfer of address and data signals between the cache memory and either the processor or system memory. The cache controller includes a control and status register that includes several bits that identify certain states of the cache memory to facilitate the power saving features of the present invention, while maintaining data integrity.

The control and power management logic monitors the activity of the processor and automatically places the secondary cache memory into a low power mode (such as, for example, turning off the cache) during periods of inactivity, or resumes full power to the secondary cache memory (or wakes up the secondary cache) when the memory activity crosses a certain threshold. If the control and power management logic determines that a period of inactivity exists, the control and power management logic provides an output signal to change the state of an on/off bit in the control and status register in the cache controller, causing the secondary cache memory to turn off (or enter a low power state).

When a write back strategy is implemented in the cache memory, the control and power management logic checks the status of a clean/dirty bit in the control and status register to determine if any unwritten or "dirty" lines exist before the cache memory is powered down. If "dirty" lines exist, the control and power management logic requires that some or all of the data in the cache memory be transmitted to the main memory for storage. Thus, if "dirty" lines exist, the lines of the secondary cache memory that have not been written back to conventional memory are flushed into the conventional memory.

In addition, the control and power management logic checks the status of a valid/invalid bit in the control and status register to determine if the contents of the cache memory are valid or invalid. This is especially critical when the secondary cache memory is powered up to eliminate the noise that may be present in the cache memory. If the contents of the secondary cache memory are determined to be invalid, the contents of the secondary cache, or the portion determined to be invalid, are cleared.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 2:
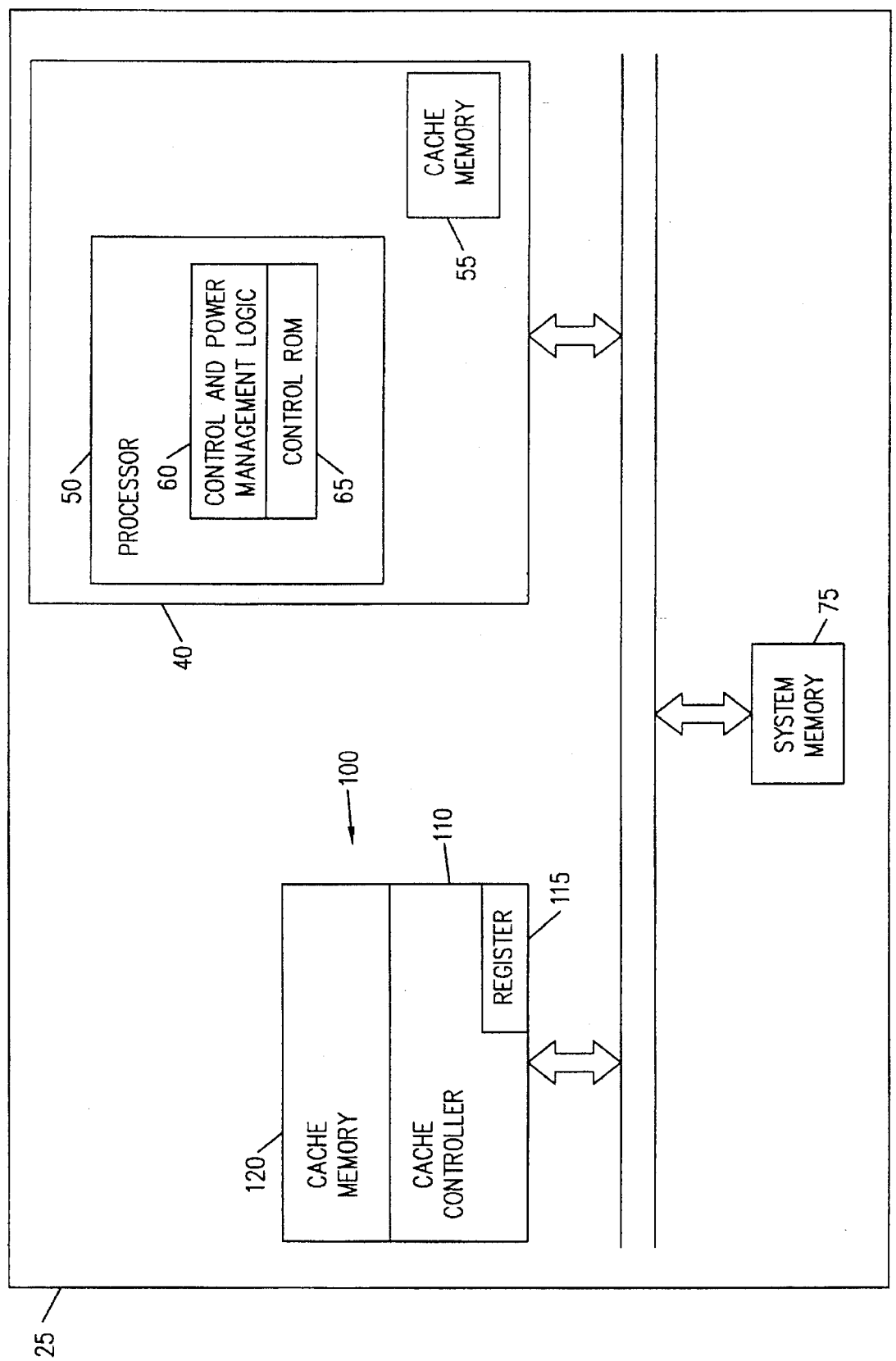
FIG. 2 depicts a functional block diagram of the secondary cache memory system constructed in accordance with the preferred embodiment.

Referring now to FIG. 2, the present invention constructed in accordance with the preferred embodiment generally comprises a portable computer 25, such as a notebook or laptop computer, that includes a microprocessor 40, an internal PC bus 70, a system (or conventional) memory 75, and a secondary cache 100. Although the cache is referred to as secondary, it will be understood that the following principles could also be applied to conserve power in any computing system that implements only one cache memory.

In accordance with the preferred embodiment, the microprocessor 40 comprises an INTEL 80486®, or equivalent structure, with a central processor or CPU 50 and an on-chip eight Kbyte memory cache 55. In accordance with the architecture of the INTEL 80486®, the cache memory 55 preferably is constructed of static random access memory ("SRAM") circuits. One skilled in the art will realize, however, that the present invention can also be used with any other microprocessor in situations where power conservation is critical.

A control and power management logic 60 preferably is constructed as part of the processor 50 and operates according to instructions in the processor firmware. As one skilled in the art will realize, however, control and power logic 60 also could be constructed and could operate independently of the processor if desired. Thus, for example, where the main processor 40 is located on a plug-in card (not shown), control and power logic 60 could be implemented in other processing circuitry residing in the motherboard architecture.

Figure 3:
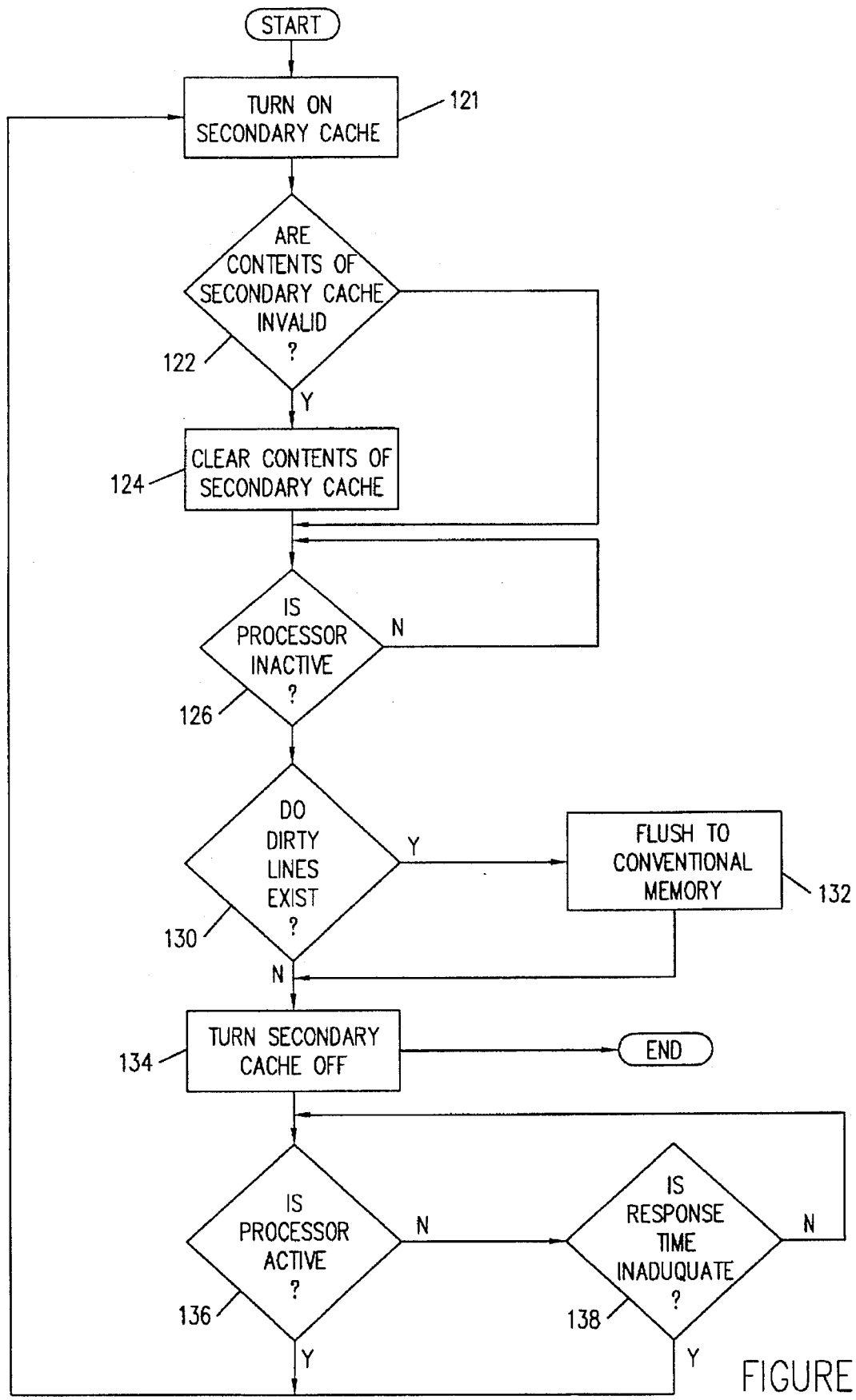
FIG. 3 shows a state diagram illustrating the operation of the control and power management logic of FIG. 2.

In the preferred embodiment, the control and power management logic 60 operates according to instructions and data stored in an associated control read only ("ROM") 65. A flow chart illustrating the method of operation of the control and power management logic 60, from which the firmware is developed, is shown in FIG. 3, which will be discussed in more detail below.

The processor 50 transmits signals to and receives signals from other system components through an internal PC bus 70. The internal bus 70 preferably is at least 32 bits wide, and can comprise an ISA, EISA or other conventional bus system.

Figure 1:
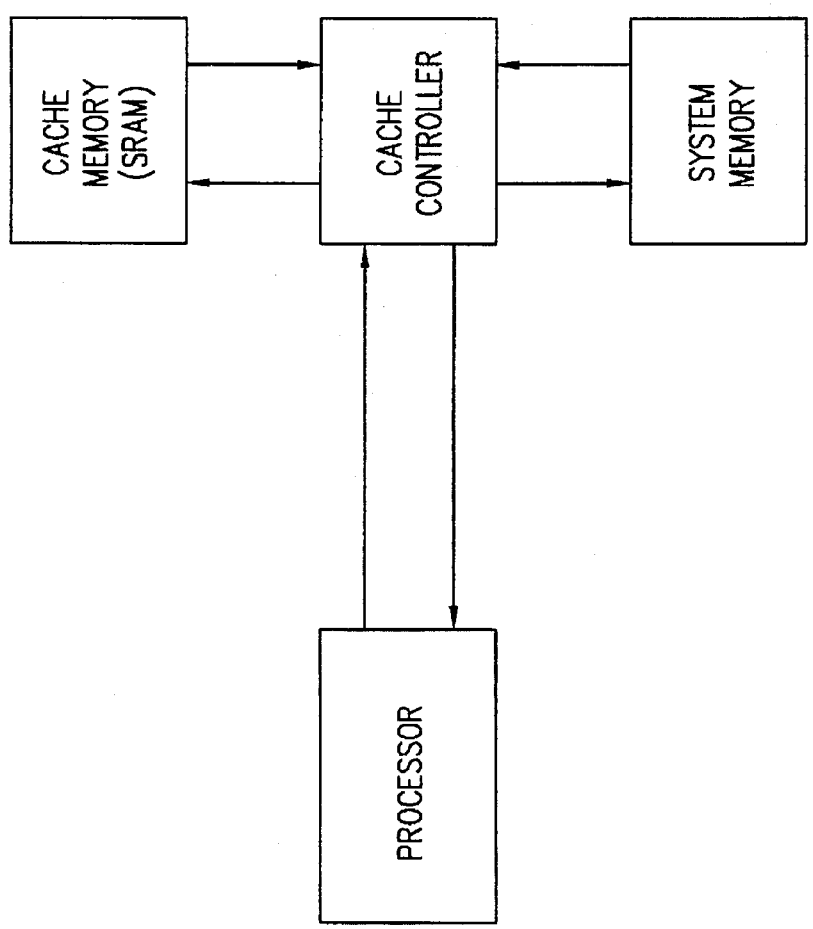
FIG. 1 depicts a functional block diagram of a prior art cache memory system.

The system or conventional memory 75 preferably comprises standard dynamic random access memory ("DRAM") circuits, although other circuits could be used without departing from the principles of this invention. The system memory 75 may be connected in parallel to the processor 50 and cache 100, as shown in FIG. 2, or may be positioned serially with the cache and processor, as shown generally in FIG. 1. One skilled in the art will understand that the size of the conventional memory 75 may vary according to the demands and desires of the operator.

The cache 100 comprises a very fast working memory for the processor 50, and essentially functions as an intermediate memory stage between the processor 50 and the system memory 75. Referring still to FIG. 2, the secondary cache 100 preferably includes a cache controller 110 and a cache memory 120.

As will be understood by one skilled in the art, the cache controller 110 controls the transfer of data and address signals from the cache memory 120 to the processor 50 and system memory 75. The cache controller 110 preferably includes one or more control and status register(s) 115, with certain dedicated bits that control the state of the secondary cache memory 120, as discussed more fully below. Referring still to FIG. 2, the cache memory 120 preferably is constructed of SRAM circuits configured in accordance with conventional techniques. Thus, the cache memory 120 preferably includes a cache directory (not shown) where addresses are stored and data slots or lines (not shown) where data is stored. Each slot or line in the cache memory is capable of storing a copy of a block of data from the system or conventional memory 75. The size of the slots may vary, but typically each individual slot holds either a block of four, eight, or sixteen bytes of data (where one byte equals eight bits), so that the contents of the slot reflect a suitably aligned block of memory. The basic word length in the INTEL 80386® and 80486® microprocessors is four bytes.

The cache memory 120 is controlled by maintaining a list of addresses in the cache directory that correspond to the location in conventional memory 75 where the data stored in the cache slot may be found. Thus, the list of addresses in the cache directory is scanned to determine whether the data from a particular memory location is stored in the cache memory.

In accordance with conventional techniques and the preferred embodiment, when the processor 50 needs to access data from memory, the cache memory 120 is first searched for the data. If the requested data is not found in the cache memory (a cache miss), the data is read from system memory 75, with the required number of wait states. At the same time, the data also is copied to the cache memory 120 for storage. If this data is required subsequently, it can be accessed directly from the cache memory 120 by the processor 50. Similarly, when the processor 50 writes data to system memory 75, a copy of the data can be stored in the cache memory 120 for future use.

To determine which data to maintain in cache memory, a process called the "least recently used" or "LRU" algorithm preferably is implemented by the processor 50 or some other processing circuitry. In accordance with conventional techniques, the LRU algorithm replaces the least recently used cache line in an associative set when there are no empty slots in the cache. One skilled in the art will appreciate that there are several similar line replacement algorithms that could be employed without affecting the operation of this invention.

There are several different types of cache memory that have been implemented and which can be used in the design of the secondary cache memory. One type of implementation is a write through system, in which all data written to system memory is written through the cache memory. In a write-through system, the data stored in the cache memory mirrors the corresponding data in conventional memory, because as one is changed, so is the other. As a result, data in the system memory is identical with the contents of the cache memory. The write through method therefore maintains a balance between system memory and cache memory.

Another alternative design that consumes potentially less memory bandwidth is a writeback system. In this type of system, not every write operation of the processor to the cache memory leads to a write operation in system memory. As long as the processor writes data to addresses already stored in cache memory, there is no writeback to conventional memory, and the corresponding address in the cache memory is modified. When the processor obtains data from the cache memory, the data bus is checked to determine whether the accessed address has been modified in the cache memory. If it has been modified, the address and corresponding data is read from cache memory. Consequently, in the write back design, the data stored in cache memory is not always consistent with the data stored in the system memory.

Figure 4:
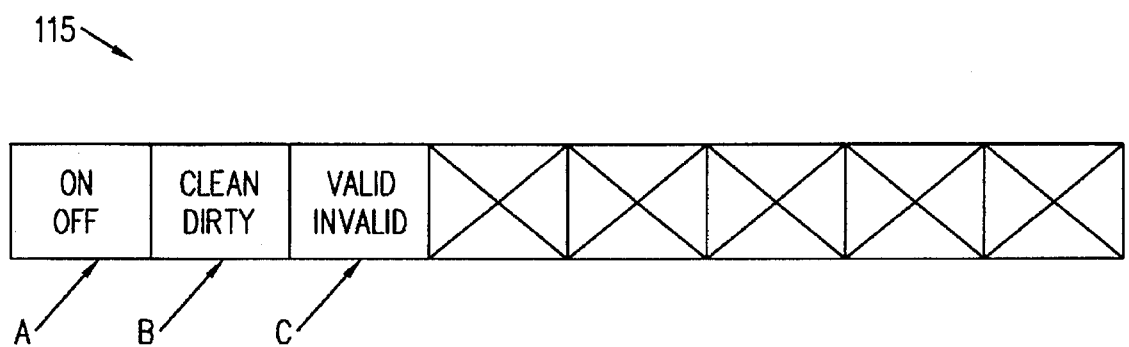
FIG. 4 illustrates the organization of the control and status register of the cache controller constructed in accordance with the preferred embodiment.

Referring now to FIGS. 2 and 4, the control and status register 115 of the cache controller 110 includes several dedicated bits that represent certain control and status information, including:

(1) Whether the cache is on or off, as determined by the value in bit A (for example, a binary "1" may turn the cache on, while a binary "0" may turn the cache off);

(2) Whether the write back lines in the cache memory are "clean" or "dirty", as indicated by the value in bit B (for example, a digital "1" may indicate that the write back lines are clean, that is, coherent with conventional memory, while a digital "0" may indicate that some of the write back lines in cache memory are dirty and not consistent with conventional memory); and (3) Whether the contents of the cache memory are valid or invalid, as indicated by the value of bit C (for example, a digital "1" may indicate that the contents of cache memory are valid, while a digital "0" may indicate that some or all of the contents of cache memory are invalid).

One skilled in the art will understand that the location of these bits may vary in the control and status register 115, or may even be located in separate registers. Similarly, while the control and status register 115 has been depicted as an eight bit register, one skilled in the art will understand that the size of this register may vary.

The on/off state, which is controlled by the value in bit A of the control and status register 115, determines whether the secondary memory cache 120 will be on or off. In the preferred embodiment, the secondary cache is turned off during periods of processor inactivity to conserve battery power of the portable computer 25. Alternatively, in addition to turning off the cache memory 120, the cache controller 110 may be placed in a low power state to further minimize power consumption.

The clean/dirty state, which is designated by the value in bit B, preferably is provided as a status bit to indicate whether or not unwritten back lines exist in the event a write back design is implemented in the cache memory 120. If cache lines exist that have not been written back to system memory (i.e., the cache lines are dirty), the contents, or a portion of the contents, of the secondary memory cache 120 must be flushed, or transmitted to the system memory 75 and stored, before the secondary memory cache 120 is powered down. The control and power management logic 60 checks bit B to determine whether or not it must flush some or all of the contents of the secondary cache memory 120 before turning off the cache memory.

The valid/invalid state, which is designated by the value in bit C of the control and status register 115, preferably is provided to notify the control and power management logic 60 whether the contents of the secondary cache memory 120 are valid or invalid. In particular, the control and power management logic 60 preferably checks the status of bit C after the secondary cache 100 is turned on to determine the validity of the contents of the cache memory 120. If bit C indicates the contents are invalid, some or all of the contents of the cache memory 120 are cleared before further operation continues to prevent contamination of the contents of system memory 75.

Referring now to FIGS. 2, 3 and 4, the preferred operation of the control and power management logic 60 will now be described. The operation of the control and power management logic 60 preferably begins soon after the power switch on the portable computer 25 is activated. It should be understood that the control and power management logic 60 may perform tasks in addition to regulating power to the secondary cache 100, and thus the flow chart of FIG. 3 should not be construed as limiting the operation of the control and power management logic 60. Sometime after it is initiated, the control and power management logic 60 turns on the secondary cache memory 120 (step 121) by transmitting an appropriate output signal addressed to bit A of the control and status register 115.

After the secondary cache memory 120 turns on, the control and power management logic 60 checks the status of bit C in the control and status register 115 (step 122). If bit C indicates that the data in the cache memory is invalid, the control and power management logic 60 clears some or all of the contents of the cache memory 120 (step 124) in accordance with conventional techniques. The secondary cache memory 120 then is ready for operation.

As the portable computer 25 is operating, the control and power management logic 60 monitors the activity level of the processor 50 (step 126). If the control and power management logic 60 determines that the processor 50 is inactive (based upon some predetermined threshold parameters of activity, such as keyboard activity, the quantity and duration of CPU latency, etc.), the control and power management logic 60 initiates a shut down procedure for the secondary cache memory 120 to conserve battery power. The control and power management logic 60 checks the status of bit B of the control and status register 115 to determine whether any dirty lines (i.e., lines that have been modified by the processor, but have not been written back to conventional memory) exist (step 130). If dirty lines exist, the dirty lines, or alternatively the entire contents of cache memory, are flushed to conventional memory, where the contents are stored (step 132). After the flushing occurs, or if flushing is not required, the control and power management logic 60 turns off the secondary cache 100 by changing the state of bit A in register 115 (step 134).

When the secondary cache memory is shut down but while the portable computer is still powered, the control and power management logic 60 monitors the activity of the processor and the interactive response time of the processor (steps 136, 138). If the processor becomes "active," or if response time becomes unsatisfactory, the control and power management logic turns back on the secondary cache memory by setting bit A in register 115 (step 120), and the cycle is repeated until the portable computer is turned off.

While a preferred embodiment of the invention has been shown and described, modifications thereof can be made by one skilled in the art without departing from the spirit of the invention.

I claim:

1. A power management system for a portable computer, the power management system comprising:
   a system memory for storing and accessing data;
   a processor that accesses data from the system memory and which transmits data to the system memory for storage;
   a cache electrically connected to said processor and to said system memory for expediting the transfer of data between the processor and the system memory;
   said cache including a cache controller and a cache memory;
   wherein the cache controller includes a control register with a bit that is variable between a first and a second value and the value of the bit determines whether power is applied to the cache memory; and
   control logic electrically connected to said cache for selectively providing power to said cache.

2. A system, as in claim 1, wherein the control logic turns off the cache when the processor is inactive.

3. A system as in claim 1, wherein the control logic turns on the cache when the processor is active.

4. A system as in claim 1, wherein the control logic turns on and turns off the cache by changing the bit value.

5. A system as in claim 4, wherein said cache memory implements a write back design, and said control register includes a second bit that indicates whether the data in the cache memory has been written back to said system memory.

6. A system as in claim 5, wherein the control logic, prior to turning off power to the cache memory, flushes the data stored in the cache memory to the system memory when the second bit indicates that data in the cache has not been written back to the system memory.

7. A system as in claim 5, wherein the control register includes a third bit that identifies whether data in the cache memory is valid.

8. A system as in claim 7, wherein the control logic clears invalid data in the cache when the third bit indicates that invalid data is present.

9. A power management system for a portable computer, wherein the portable computer includes a microprocessor with a central processor and an internal cache memory, the power management system comprising:
   a secondary cache memory in said portable computer that is electrically connected to said processor for reducing the number of wait states encountered by the central processor;
   control logic electrically connected to said central processing unit and to said secondary cache memory;
   wherein said control logic monitors the activity of said central processor and turns off said secondary cache memory when the processor is inactive, while the processor remains operational.

10. A system as in claim 9, wherein the control logic turns on the secondary cache memory when the processor becomes active.

11. A system as in claim 10, wherein said secondary cache memory includes a control register with a bit that indicates whether the secondary cache includes write back lines.

12. A system as in claim 11, wherein the control logic checks the bit and flushes the secondary cache memory prior to turning off the secondary cache memory.

13. A power management system for a portable computer, wherein the portable computer includes a microprocessor with a central processor and an internal cache memory, the power management system comprising:
   a secondary cache memory in said portable computer that is electrically connected to said processor for reducing the number of wait states encountered by the central processor;
   control logic electrically connected to said central processing unit and to said secondary cache memory,
   wherein said control logic monitors the activity of said central processor and turns off said secondary cache memory when the processor is inactive,
   and wherein the control logic turns on the secondary cache memory when the number of wait states become excessive.

14. A system for conserving power in a portable computer, said portable computer including a processor and conventional memory, the system comprising:

a cache for expediting the transfer of data between the processor and the conventional memory, said cache including:
    a cache controller with a control register that includes a first bit, a second bit and a third bit, each of said bits having two states; and
    a cache memory comprised of SRAM circuits with a cache directory for storing addresses and a memory buffer with lines for storing data;
a control and power management logic connected to said cache controller, wherein said control and power management logic:
    changes the state of the first bit to control power to the cache memory;
    checks the state of the second bit to determine if lines in the cache memory must be flushed to conventional memory prior to turning off power to the cache; and
    checks the state of the third bit to determine if data in said cache memory is valid after said cache is turned on.

15. A method for conserving power in a portable computer that includes a processor, a system memory and a secondary cache memory, comprising the steps of:
    (a) turning on the secondary cache memory while maintaining the processor in an operational state;
    (b) determining if the processor is inactive;
    (c) turning off the secondary cache memory if the processor is inactive; and
    (d) determining if the processor is active.

16. A method as in claim 15, further comprising the steps of:
    (a)(1) determining if data in the secondary cache memory is valid; and
    (a)(2) clearing the data from the secondary cache memory that is invalid.

17. A method as in claim 16, wherein step (a)(1) includes checking a status bit to determine if the data in the secondary cache memory is valid.

18. A method for conserving power in a portable computer that includes a processor, a system memory and a cache memory, comprising the steps of:
    (a) turning on the cache memory by changing the state of a control bit;
    (b) determining if the processor is inactive;
    (c) turning off the cache memory by changing the state of the control bit if the processor is inactive; and
    (d) determining if the processor is active.

19. A method as in claim 18, wherein step (c) includes the step of checking a status bit to determine whether the cache memory is a write back design that includes dirty lines.

20. A method as in claim 19, wherein the dirty lines are flushed to the system memory.

* * * * *